May 3, 1938.  E. A. LAHIERE  2,115,817
POULTRY FEEDER
Filed May 17, 1937
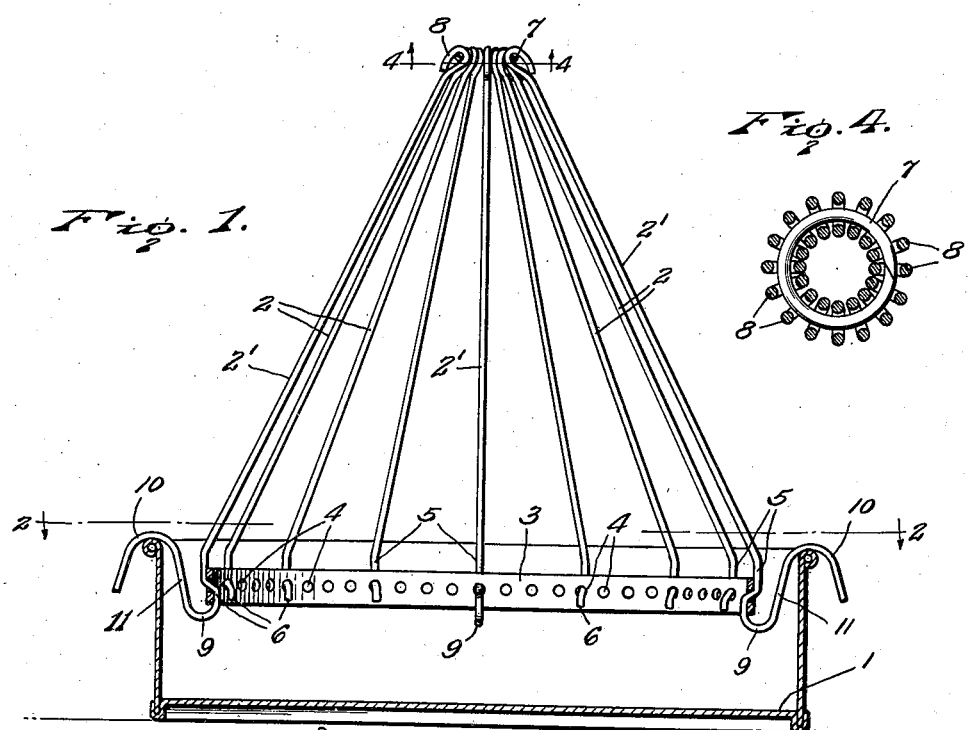
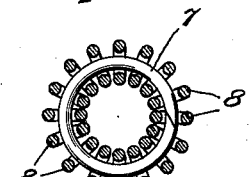
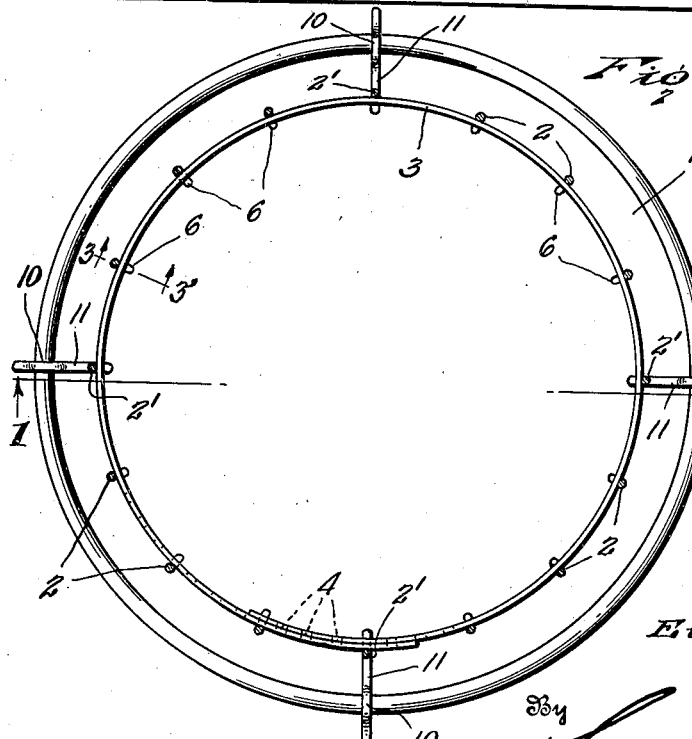
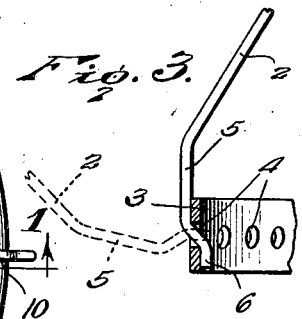
Inventor
Eugene A. Lahiere.
By Lacey & Lacey, Attorneys Patented May 3, 1938

2,115,817

UNITED STATES PATENT OFFICE 2,115,817

POULTRY FEEDER

Eugene A. Lahiere, Princeton, N. J.

Application May 17, 1937, Serial No. 143,167

7 Claims. (Cl. 119—61)

This invention relates to a poultry feeder of the open pan type, and one object of the invention is to provide a poultry feeder having a guard which may be easily applied or removed from the pan and, when in place, be supported in an upright position over the pan with its lower portion extending into the upper portion of the pan in such relation thereto that, while chickens and other poultry may have easy access to the feed placed in the pan, they will be prevented from entering the pan while feeding or scattering the feed while standing outside the pan and feeding.

Another object of the invention is to provide the pan with a guard so constructed that it may be easily adjusted to fit the particular pan to which it is applied and also permit a predetermined number of guard wires or rods to be used and these rods disposed either very close together or at quite a distance apart from each other circumferentially of a ring with which lower ends of the rods are connected.

It is another object of the invention to provide a guard wherein certain of the wires or rods have portions extended beyond the ring and formed into hooks, by means of which the guard is suspended from the upper edge of the peripheral wall of the pan.

It is another object of the invention to so secure upper ends of the guard wires that, while they will be maintained in upwardly converging relation to each other to form a conical guard, movement of upper ends of the rods relative to each other will be permitted and thus allow these rods to shift and provide such an unstable support that, if a chicken or other fowl attempts to roost upon the upper end of the guard, the fowl will be prevented from doing so.

The invention is illustrated in the accompanying drawing, wherein

Figure 1 is a view showing the pan and the improved guard in vertical section along the line 1—1 of Figure 2.

Figure 2 is a view taken transversely through the guard along the line 2—2 of Figure 1 with the pan shown in top plan, Figure 3 is a fragmentary view taken along the line 3—3 of Figure 2 and illustrating the manner in which the guard wires or rods are applied to the ring, and Figure 4 is a sectional view through the upper end of the guard taken along the line 4—4 of Figure 1 and illustrating the manner in which upper ends of the guard wires or rods are mounted.

The pan 1 is formed of strong metal in any desired manner and may be of any predetermined depth and diameter. It is of circular outline when viewed in top plan as shown in Figure 2 and any desired quantity of feed may be placed in the pan so that chickens or other fowls may eat the same while standing about the pan. When feed, such as corn meal, grain or the like, is placed in an open pan, chickens and other fowl have a tendency to step into the pan and throw the feed out of the pan by scratching, and even if they stand about the pan and thrust their heads into the pan while consuming the feed, they often throw the feed out of the pan by rubbing their bills against the peripheral wall of the pan.

In order to prevent such waste of feed, there has been provided a guard which is applied to the pan, as shown in Figures 1 and 2. This guard consists of a plurality of guard wires or rods 2 having their lower ends connected with a ring 3 and their upper ends secured in bunched formation and maintained in such relation to each other that the rods converge upwardly and provide a guard which is of conical formation. The mounting ring 3 is formed of sheet metal and the strip of metal from which this ring is formed may be of any length desired. Free end portions of the metal strip are overlapped and throughout its length the strip is formed with a series of openings 4 which are spaced from each other longitudinally of the strip, the openings in the overlapped portions of the strip being disposed in registration with each other so that, when lower end portions of the rods 2 are passed through selected openings of the ring, the rods having their lower ends engaged through openings in the overlapped portions of the strip will serve to maintain these end portions in the overlapped relation to each other. It will thus be seen that the rods not only serve as guards but also as means for securing the ends of the strip in overlapped relation to each other and cause the strip to form a ring of a predetermined diameter adapting it to be placed in the pan in spaced relation to the peripheral wall thereof. Referring to Figures 1 and 3, it will be seen that lower end portions of the rods are bent to provide shanks 5 which extend vertically when the rods are secured in upwardly converging relation to each other to provide the conical guard. Lower ends of the shanks are bent to form bills 6 which extend inwardly through the openings 4 of the ring, and upon referring to Figure 3, it will be seen that, when upper ends of the rods are secured in bunched formation by the split ring or collar 7 which passes through the eyes 8 formed by bending upper ends of the rod, the bills or hooks will be maintained through the openings 4 and prevented from slipping out of the openings. Therefore, the rods will be well supported. The ring or collar 7 fits loosely about the upper ends of the rods and, therefore, while the rods will be maintained in upward converging relation to each other to form a conical guard, they will be permitted to shift and provide an unstable support upon which a chicken cannot readily roost. This movement of the upper ends of the rods is such that, if a chicken attempts to roost upon the upper end of the guard, transverse movement of the rods relative to each other will cause the chicken to lose its balance and fall from the guard. Certain of the rods are of greater length than the remaining rods. These rods which are of greater length have been designated by the numeral 2' and, while four have been shown, it is to be understood that additional ones may be provided if so desired. These longer rods after being bent to form the bills 6 are bent back upon themselves, as shown at 9, and then upwardly at an incline and outwardly and downwardly to form large suspension hooks 10 for engaging over the upper edge of the peripheral wall of the pan and removably mounting the guard in operative relation to the pan, as shown in Figures 1 and 2. Referring to these figures, it will be seen that, when the guard is in place, it extends downwardly into the pan below the upper edge of the peripheral wall of the pan, and since the shanks 11 of the suspension hooks 10 extend diagonally, as clearly shown in Figure 1, the ring 3 will be spaced inwardly from the peripheral wall of the pan. Therefore, when the poultry thrust their heads between the guard wires or rods in order to feed from the pan, their heads will be spaced from the peripheral wall of the pan, and when they clean their bills by rubbing against the ring or move their heads transversely in a scratching motion during eating, the feed will be confined in the pan and not thrown out of the pan. While the ring is spaced inwardly from the pan, the space between the ring and the peripheral wall of the pan is not sufficient to permit a hen or other fowl to thrust its head down between the pan and the ring for feeding. By providing an appropriate number of rods either wide or narrow spaces can be provided between the rods and either full grown or small chickens or other fowls allowed to feed from the pan. It will thus be seen that, when a pan of feed specially prepared for small or half grown chickens is placed in a yard or pen in which both full grown and small chickens are confined, the full grown chickens or other fowls will be prevented from feeding out of the pan containing the feed intended for the small chickens. When it is desired to transfer the guard to another pan of a larger or smaller diameter than the pan with which the guard has been used, the guard wires or rods having their lower ends passing through openings of the overlapped portions of the strip forming the ring may be disconnected from the split ring 7 and swung outwardly and downwardly, as indicated by dotted lines in Figure 3, to such a position that their lower end portions may be withdrawn from the registering openings of the overlapped portions of the ring. The ring can then be expanded or contracted and the rods replaced. In the same manner additional guard wires or rods may be applied when it is desired to reduce the space between the rods or certain of the rods may be removed and the remaining rods rearranged to provide wider spaces between them.

While it has been stated that the guard is applied to a pan holding feed, it is to be understood that the pan may contain drinking water and the guard serve to prevent fowls from dirtying the water by stepping into the pan.

Having thus described the invention, what is claimed as new is:

1. A device of the character described comprising a pan open at its top, and a guard for said pan consisting of a ring of a diameter adapting it to fit within the pan, and rods above said ring having their upper ends loosely secured in bunched formation and their lower end portions engaged through the ring, the lower ends of certain of said rods being provided with means for engaging the peripheral wall of the pan and supporting the guard in operative relation thereto with the ring spaced downwardly below the top of the pan.

2. In combination with a pan open at its top and having a bottom and a peripheral wall, a guard comprising a ring of a diameter adapting it to fit within the pan in spaced relation to the peripheral wall thereof, and a plurality of rods extending upwardly from said ring and having their upper ends loosely secured in bunched formation, lower end portions of said rods being spaced from each other circumferentially of the ring and passed through openings formed in the ring to connect lower ends of the rods with the ring, certain of said rods having their lower end portions bent upwardly and outwardly from the ring to provide hooks for engaging over the upper edge of the peripheral wall of the pan and supporting the guard over the pan in operative relation thereto with the ring disposed within the pan below the upper edge of the peripheral wall.

3. In combination with a pan open at its top, a guard comprising a ring formed from a strip of perforated material having its openings spaced from each other longitudinally of the strip, end portions of the strip being overlapped to provide a ring of a diameter adapting it to fit within the pan, and rods over the ring having lower end portions disposed about the ring in spaced relation to each other circumferentially thereof and bent to form bills extending inwardly through selected openings of the ring and downwardly, means to loosely hold upper ends of the rods in bunched formation, certain of said rods having extended lower end portions bent outwardly under the ring and then upwardly beyond the ring and terminating in hooks for engaging over the upper edge of the peripheral wall of the pan and supporting the guard.

4. In combination with a pan having a peripheral wall, a guard comprising a ring formed from a strip of material having openings formed therein in spaced relation to each other circumferentially of the ring, rods extending upwardly from the ring and terminating in eyes at their upper ends, a split ring loosely engaged through the eyes at the upper ends of said rods and maintaining upper ends of the rods in bunched formation to provide a body for the guard of conical formation, lower ends of said rods being disposed in overlapping relation to the outer face of said ring and bent to form bills extending inwardly through selected openings of the ring, and hook-shaped members extending upwardly and outwardly from the ring for engaging over the peripheral wall of the pan and supporting the guard over the pan in operative relation thereto with the ring below the upper edge of the peripheral wall of the pan.

5. A guard for a poultry pan comprising a ring having openings formed therein in spaced relation to each other circumferentially of the ring, rods over the ring converging upwardly, lower ends of said rods being bent to form anchoring members engaged through selected openings of the ring and readily removable therefrom, a member fitting loosely about upper end portions of said rods and maintaining the same in bunched formation, upper ends of the rods being movable relative to each other to provide an unstable structure and prevent fowls from roosting upon the guard, and means for supporting the guard over a receptacle in operative relation thereto.

6. A guard of the character described comprising a ring, rods extending upwardly from said ring and converging towards each other and having their lower ends loosely and detachably engaged with the ring in predetermined spaced relation to each other circumferentially of the ring, means to loosely hold upper ends of said rods in bunched formation, and means for supporting said guard over a receptacle in operative relation thereto.

7. A guard of the character described including a ring of a diameter to fit within a feed receptacle in spaced relation to walls thereof, rods extending upwardly from said ring in spaced relation to each other circumferentially of the ring and having their upper ends loosely secured in bunched formation, and supporting members extending outwardly and upwardly from said ring for engaging over the upper edge of the peripheral wall of a receptacle and supporting the guard over the receptacle with the ring disposed within the receptacle below the upper edge of its peripheral wall.

EUGENE A. LAHIERE.